C. LE G. FORTESCUE.
CIRCUIT INTERRUPTING SYSTEM.
APPLICATION FILED OCT. 7, 1915.

1,201,031.

Patented Oct. 10, 1916.

WITNESSES:

INVENTOR
Charles Le G. Fortescue
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

CIRCUIT-INTERRUPTING SYSTEM.

1,201,031.   Specification of Letters Patent.   Patented Oct. 10, 1916.

Application filed October 7, 1915. Serial No. 54,587.

*To all whom it may concern:*

Be it known that I, CHARLES LE G. FORTESCUE, a subject of the King of England, and a resident of Pittsburgh, in the county of Allegheny and State of Pennsylvania, have invented a new and useful Improvement in Circuit-Interrupting Systems, of which the following is a specification.

My invention relates to circuit-interrupting systems, and it has for its object to provide means for interrupting the alternating-current circuit of an alternating-current-direct-current-distributing system that shall be responsive to direct-current-circuit conditions.

My copending application, Serial No. 54,588, filed Oct. 7, 1915, sets forth an alternating-current-direct-current-distributing system wherein the alternating-current circuit is interrupted in response to the conditions in the direct-current circuit. In such systems, the magnetic energy of the direct-current circuit is permitted to be gradually dissipated when the alternating-current circuit is interrupted, to thus preclude the generation of an excessive direct-current voltage, which would occur if the direct-current circuit should be independently interrupted. It is advantageous, in such systems, to interrupt the alternating-current circuit within a half cycle, and, in order to accomplish this, I provide, in my present invention, two asymmetrically arranged or parallel-connected vapor valves that I connect in the alternating-current circuit and the arcs of which I cause to be extinguished in response to direct-current-circuit conditions, to thereby interrupt the alternating-current circuit within one half cycle.

Figure 1:
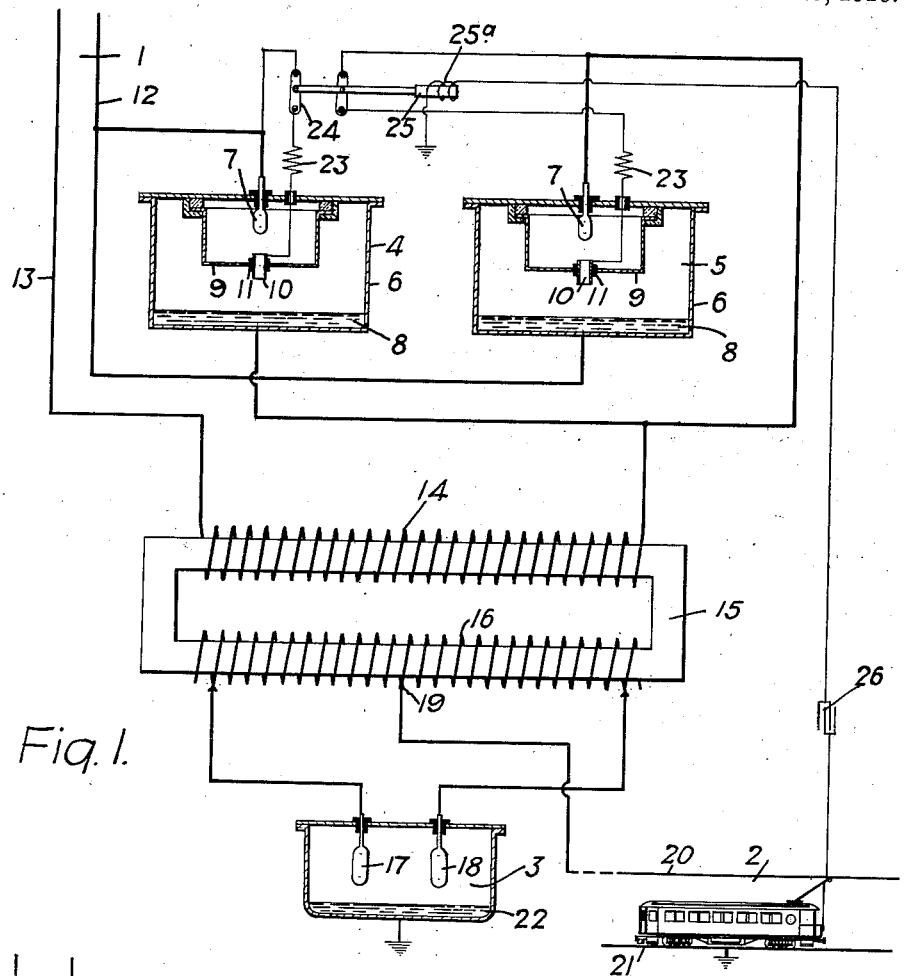
Figure 2:
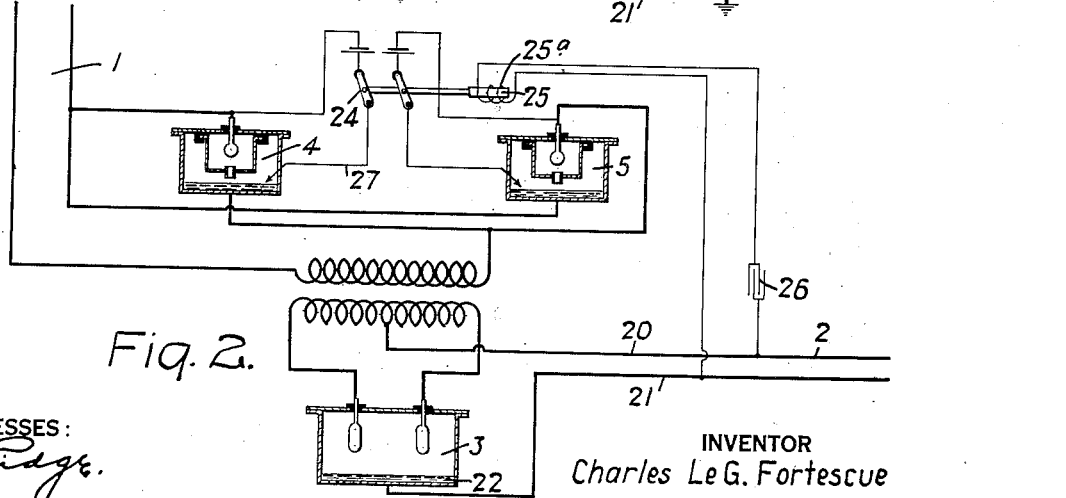

In the accompanying drawing, Figure 1 is a diagrammatic view of a distributing system embodying one form of my invention, and Fig. 2 is a diagrammatic view of a distributing system embodying a modified form of my invention.

An alternating-current circuit 1 is adapted to supply energy to a direct-current circuit 2 by means of a vapor converter 3 or other suitable type of converting device. Two asymmetrically arranged or parallel-connected vapor valves 4 and 5 are connected in the alternating-current circuit, and the arcs thereof are extinguished in response to predetermined circuit conditions in the direct-current circuit 2.

The valves 4 and 5 severally comprise a containing member 6, an anode 7, a mercury cathode 8 and an anode or ionizing shield 9. The anode shield 9 is insulated from the containing member 6 and surrounds the anode 7 for the purpose of protecting the same from the sides of the containing member. A conducting tube 10 is disposed in the shield 9 and is insulated therefrom by an insulating bushing 11.

The anode 7 of the valve 4 is connected to the conductor 12 of the circuit 1, as is also the cathode 8 of the valve 5. The cathode 8 of the valve 4 is operatively connected to the anode 7 of the valve 5. The conductor 13 of the circuit 1 is connected to one terminal of the primary winding 14 of a transformer 15, the other terminal of which is connected to the cathode 8 of the valve 4 and the anode 7 of the valve 5. These connections are so made that one half of the wave traverses the valve 4 and, consequently, the winding 14 in one direction, and the other half of the wave traverses the valve 5 and, consequently, the winding 14 in the opposite direction.

Referring particularly to Fig. 1 of the drawings, the secondary winding 16 of the transformer 15 is connected to the anodes 17 and 18 of the converter 3, and the mid-point 19 of the winding 16 is connected to the conductor 20 of the circuit 2. The other conductor 21 of the circuit 2 is grounded, as is also the cathode 22 of the converter 3.

The conducting tube 10 of the valve 4 is connected, through a resistor 23 and a switch 24, to the anode 7, and the tube 10 of the valve 5 is similarly connected, through a resistor 22 and the switch 24, to its respective anode 7. The switch 24 is adapted to be actuated by an electromagnet 25 having a winding $25^a$ one terminal of which is grounded and the other terminal of which is connected to one terminal of a condenser 26. The other terminal of the condenser 26 is connected to the conductor 20 of the circuit 2. The condenser 26 and the winding $25^a$ are so proportioned that, when the voltage of the circuit 2 changes quickly, because of a ground or a short circuit thereon, the condenser 26 will discharge sufficient current through the winding $25^a$ to open the switch 24. When the switch 24 is opened, the tube 10, that is normally maintained at the same polarity as the anodes of the valves, causes the electrons that pass from the cathodes 8 to the anodes 7 to be attracted and thereby extinguish the arc between the cathodes and the anodes, thus interrupting the alternating-current circuit 1.

When the arcs are established in the valves 4 and 5 by any of the well known methods, current traverses the same alternately to supply direct-current energy to the circuit 2 through the converter 3. Upon the occurrence of abnormal conditions in the circuit 2, the condenser 26 discharges, in anticipation of a dangerous value of current, to extinguish the arcs of the valves 4 and 5 and to thereby permit the magnetic energy of the circuit to be gradually dissipated, thus precluding the generation of excessive voltages.

In Fig. 2 of the drawings, the switch 24 is adapted to open the keep-alive circuit 27 of the valves 4 and 5 to extinguish the arc in response to circuit conditions in the direct-current circuit 2. In other respects, the system illustrated in Fig. 2 is the same as the system shown in Fig. 1, with the exception, however, that the conductor 21 of the circuit is connected to the cathode 22 of the converter 3, instead of to the ground, and the winding 25ª of the electromagnet 25 is connected to the conductors 20 and 21 through the condenser 26. When a short circuit or overload occurs upon the circuit 2, as shown in Fig. 2 of the drawings, the condenser 26 discharges sufficient current through the winding 25ª to cause the switch 24 to open the keep-alive circuits 27 and to thus extinguish the arcs of the converters 4 and 5. Since only one half of the wave passes through one valve, it will be understood that, when the arc of the operating valve or converter is extinguished, no current is traversing the other valve, and, consequently, when the arcs are simultaneously extinguished, the alternating current must necessarily be interrupted within half the cycle.

I do not limit my invention to the particular devices illustrated, as many modifications may be made therein without departing from the spirit and scope of the invention, as set forth in the appended claims.

I claim as my invention:

1. In a distributing system, the combination with an alternating-current circuit, a direct-current circuit, a converting device connected between the said circuits, and asymmetrically arranged valves disposed between the alternating-current circuit and the converting device, said valves having shields surrounding the anodes thereof and electrically connected thereto, of means for interrupting the electrical connection between the shields and the anodes in response to predetermined conditions in the direct-current circuit.

2. In a system of distribution, the combination with an alternating-current circuit, a direct-current circuit supplied therefrom, and two parallel-connected vapor converters connected in the alternating-current circuit, said converters having shields between the respective electrodes thereof that are electrically connected to the anodes, of means for interrupting the connection between the shields and the respective anodes thereof in response to circuit conditions in the direct-current circuit.

3. In a system of distribution, the combination with an alternating-current circuit, a direct-current circuit supplied therefrom and two parallel-connected converters in the alternating-current circuit, said converters having shields between the respective electrodes thereof that are electrically connected to the anodes, of means for interrupting the electrical connection between the shields and the respective anodes in anticipation of circuit conditions in the direct-current circuit.

4. In a distributing system, the combination with an alternating-current circuit, a direct-current circuit operatively connected thereto, and two parallel-connected vapor converters connected in the alternating-current circuit, of means for extinguishing the arcs of the converters in response to direct-current-circuit conditions.

5. In a system of distribution, the combination with an alternating-current circuit, a direct-current circuit, a converter connected therebetween, and parallel-connected valves disposed in the alternating-current circuit, of means for extinguishing the arcs of the valves in response to circuit conditions in the direct-current circuit.

6. In a system of distribution, the combination with an alternating-current circuit, a direct-current circuit, a converter connected therebetween and parallel-connected valves disposed in the alternating-current circuit, of means for extinguishing the arcs of the valves in response to circuit conditions in the direct-current circuit to thereby permit the energy of the direct-current circuit to be gradually dissipated.

7. A system of distribution comprising an alternating-current circuit, a direct-current circuit, a main vapor converter connected therebetween, two auxiliary vapor converters so connected in the alternating-current circuit that one-half of the wave passes through one converter and the other half of the wave passes through the other converter, of electro-responsive means operatively connected to the direct-current circuit for extinguishing the arcs of the auxiliary converters under predetermined conditions.

8. A system of distribution comprising an alternating-current circuit, a direct-current circuit, a main vapor converter connected therebetween, two auxiliary vapor converters so connected in the alternating-current circuit that one-half of the wave passes through one and the other half of the wave passes through the other, of electro-responsive means operatively connected to the direct-current circuit for extinguishing the arcs of the auxiliary converters in anticipation of predetermined conditions in the direct-current circuit.

In testimony whereof, I have hereunto subscribed my name this 29th day of Sept. 1915.

CHARLES LE G. FORTESCUE.